(12) United States Patent
Manion

(10) Patent No.: US 7,757,415 B2
(45) Date of Patent: Jul. 20, 2010

(54) HORIZONTAL ICE CUTTINGS CONVEYOR FOR ICE RESURFACING MACHINES

(76) Inventor: Patrick R. Manion, 5101 E. Crestview Dr., Paradise Valley, AZ (US) 85253

( * ) Notice: Subject to any disclaimer, the term of this patent is extended or adjusted under 35 U.S.C. 154(b) by 0 days.

(21) Appl. No.: 12/192,044

(22) Filed: Aug. 14, 2008

(65) Prior Publication Data

US 2010/0037492 A1    Feb. 18, 2010

(51) Int. Cl.
*E01H 4/00*    (2006.01)
(52) U.S. Cl. .......................................... 37/219; 299/24
(58) Field of Classification Search ............ 37/219–224, 37/227; 299/24, 25, 28, 39.8; 425/200–209, 425/461–467
See application file for complete search history.

(56) References Cited

U.S. PATENT DOCUMENTS

| 3,178,837 | A | | 4/1965 | Capalbo |
| 3,475,056 | A | * | 10/1969 | Jones ........................... 299/24 |
| 3,622,205 | A | * | 11/1971 | Zamboni ..................... 299/24 |
| 3,705,746 | A | | 12/1972 | McLeod |
| 4,201,348 | A | * | 5/1980 | Bigbee et al. ........... 241/101.76 |
| 6,328,465 | B1 | * | 12/2001 | Tamminga ................... 366/314 |
| 7,445,442 | B2 | * | 11/2008 | Peterson et al. ............. 425/208 |

* cited by examiner

*Primary Examiner*—Robert E Pezzuto
(74) *Attorney, Agent, or Firm*—Joseph W Mott

(57) ABSTRACT

The horizontal conveyor of an ice re-surfacing machine implements auger flights in which successive half circles of the flight have slightly different radii. The successive contact of larger and smaller radius flights against ice building up in front of the horizontal conveyor breaks up and dissipates the ice.

15 Claims, 8 Drawing Sheets

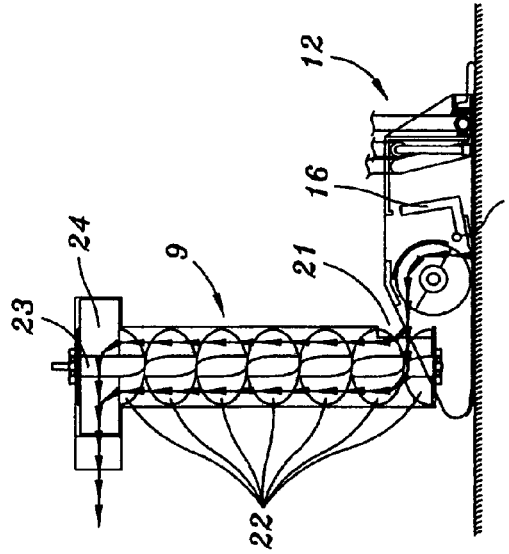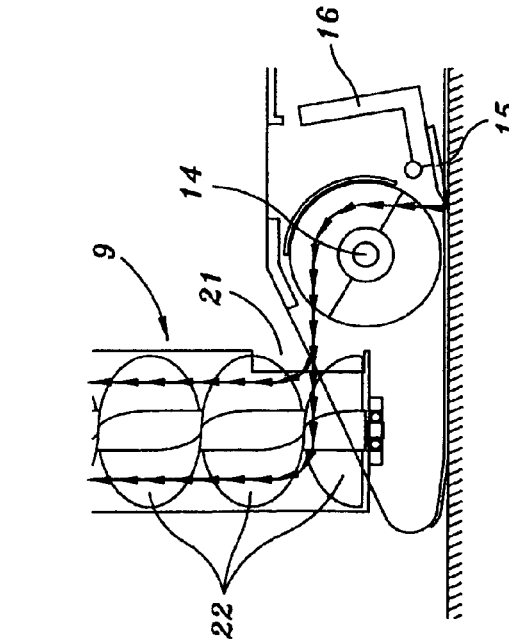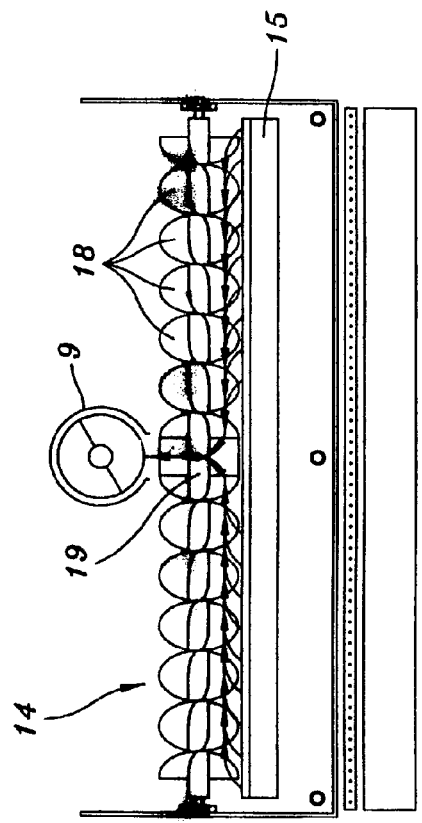
Figure 2.
Figure 3.
Figure 4.

HORIZONTAL ICE CUTTINGS CONVEYOR FOR ICE RESURFACING MACHINES

BACKGROUND OF THE INVENTION

An ice re-surfacing machine for skating rinks and the like has two basic parts. The first is the main wheeled body driven over the ice, usually on standard rubber tires. The body generally includes motive power, an operator's seat and controls, a collection system and storage bin for ice cuttings, water tanks for the ice-washing and ice-making process, and a hydraulic arms system for carrying and positioning the ice re-surfacing apparatus.

The second part is the apparatus that re-surfaces the ice in a single pass. This structure, which is towed over the ice by the main body, is generally referred to as the "conditioner," but sometimes is called the "sled". The conditioner, carried at the back of the main body on hydraulically activated arms, is essentially an open-bottomed steel box that allows the re-surfacing components access to the ice surface when lowered into operating position and pulled across the ice. A runner and side plate on each side, parallel to the direction of travel, supports the conditioner in operation and confines the ice chips collected and water used in re-surfacing.

The majority of imperfections created in the ice surface by ice-skating are limited to one to two millimeters of ice depth. The conditioner holds a large blade, usually steel, that shaves a very thin layer off the ice surface. Generally, the blade is attached to a supporting draw bar, which is mounted to the conditioner frame.

Ice cuttings generated by the shaving blade must be removed from the ice surface as the blade is pulled along. Mounted forward of and parallel to the blade is a screw conveyor, variously known as a "horizontal conveyor" or "horizontal auger" or "horizontal screw." The horizontal conveyor comprises a cylindrical shaft onto which one or more helical flanges, referred to as "flights," are wound around and attached, similarly to the thread on a wood screw. The helical flight converts the rotational spin of the shaft into linear motion parallel to the shaft.

In most ice-resurfacing machines, the horizontal conveyor is configured so that flights on the left side move ice shavings from the outside toward the center of the conveyor, and flights on the right side move ice shavings from the outside toward the center as well. In the center of the horizontal conveyor, flat plates mounted parallel to the rotational axis of the shaft, called "paddles", connect to the left side and right side auger flights. The paddles are part of the "slinger", which transfers ice shavings to a vertical conveyor. In operation, the blade shaves the ice, creating ice particles that build up in front of the blade and are caught in the flights of the horizontal conveyor. The horizontal conveyor's rotating flights move the ice particles to the center, where the slinger throws them onto the vertical conveyor.

The vertical conveyor is designed to accept the stream of ice cuttings thrown from the slinger of the horizontal conveyor and move them upward for placing into the ice cuttings storage tank in the main body. The vertical conveyor is also a screw type conveyor, similar in design and function to the horizontal conveyor. All of the helical flights are wound around the central shaft in the same direction, imparting a continuous upward movement of ice cuttings from the bottom of the conveyor to the top. At the top, slinger paddles sweep the cuttings into the storage tank. The vertical conveyor is encased in a close fitting metal tube running the length of the auger. A lower aperture, facing the slinger of the horizontal conveyor, receives ice cuttings from the slinger, whereby the cuttings begin ascending on the flights. An aperture at the top faces the ice cuttings storage tank. The vertical conveyor slinger paddles throw the ice cuttings into the tank.

Behind the blade and draw bar is a wash water system that discharges cold water through a manifold that sits parallel to the blade. The wash water system includes a rubber squeegee mounted on the bottom of the back wall of the conditioner and a suction pump with an intake that projects nearly to the surface along that back wall. In operation, cold water from a tank in the main body is discharged onto the ice surface just behind the blade assembly, and is constrained by the conditioner's side runners and the squeegee as the machine moves forward. By regulating the flow of water and the suction of the collection pump, the operator maintains a wash water pool of constant size behind the blade assembly. This moving pool floats contaminants off the ice surface and floods any deep grooves and pits in the ice surface, then is collected and returned to the water tank.

The last part of the conditioner is the ice maker, mounted to the back wall of the conditioner. A discharge manifold sprays multiple small jets of hot water from a tank in the main body onto the outside back wall of the conditioner, where it forms a continuous sheet of water cascading down onto the ice across the conditioner's entire width. Finally a cloth water spreader, called a "mop", evenly spreads and polishes the ice making water into a smooth surface.

Conventional ice re-surfacing machines suffer from build-up of ice particles in front of the horizontal conveyor. Because of conditions during operation, some ice cuttings from the blade, thrown by the horizontal conveyor's slinger, strike the areas around the mouth of the vertical conveyor and fall onto the ice in front of the horizontal conveyor. Additionally, the horizontal conveyor throws some of the cuttings it collects forward onto the ice along the entire length of the conveyor. While some of these cuttings are re-swept by the flights of the horizontal conveyor, some join up so as to form an obstructing build up that fuses together and prevents ice cuttings on the surface of the ice in front of the conditioner from ever getting swept into the containing tank. The present invention modifies the conveyor so it forces any solidified ice cuttings buildup being pushed forward by the conveyor into the space swept by the conveyor flights.

SUMMARY OF THE INVENTION

The horizontal conveyor of the current invention does not use the conventional circular cross section and constant radius on its auger flights. Instead, the conveyor is bisected lengthwise into two halves along the axis of its central shaft, with each half having a different radius. A small difference in radius between two "halves" aids in displacing built up ice cuttings and forcing ice to be swept by the conveyor flights rather than be pushed forward.

DRAWINGS

FIG. 2 shows a side view of a vertical conveyor in respect to the conditioner.

FIG. 3 shows a side view of a vertical conveyor with the path of the ice cuttings from the horizontal conveyor to the storage tank.

FIG. 4 is a top view of the horizontal conveyor and vertical conveyor.

DETAILED DESCRIPTION

Figure 1:
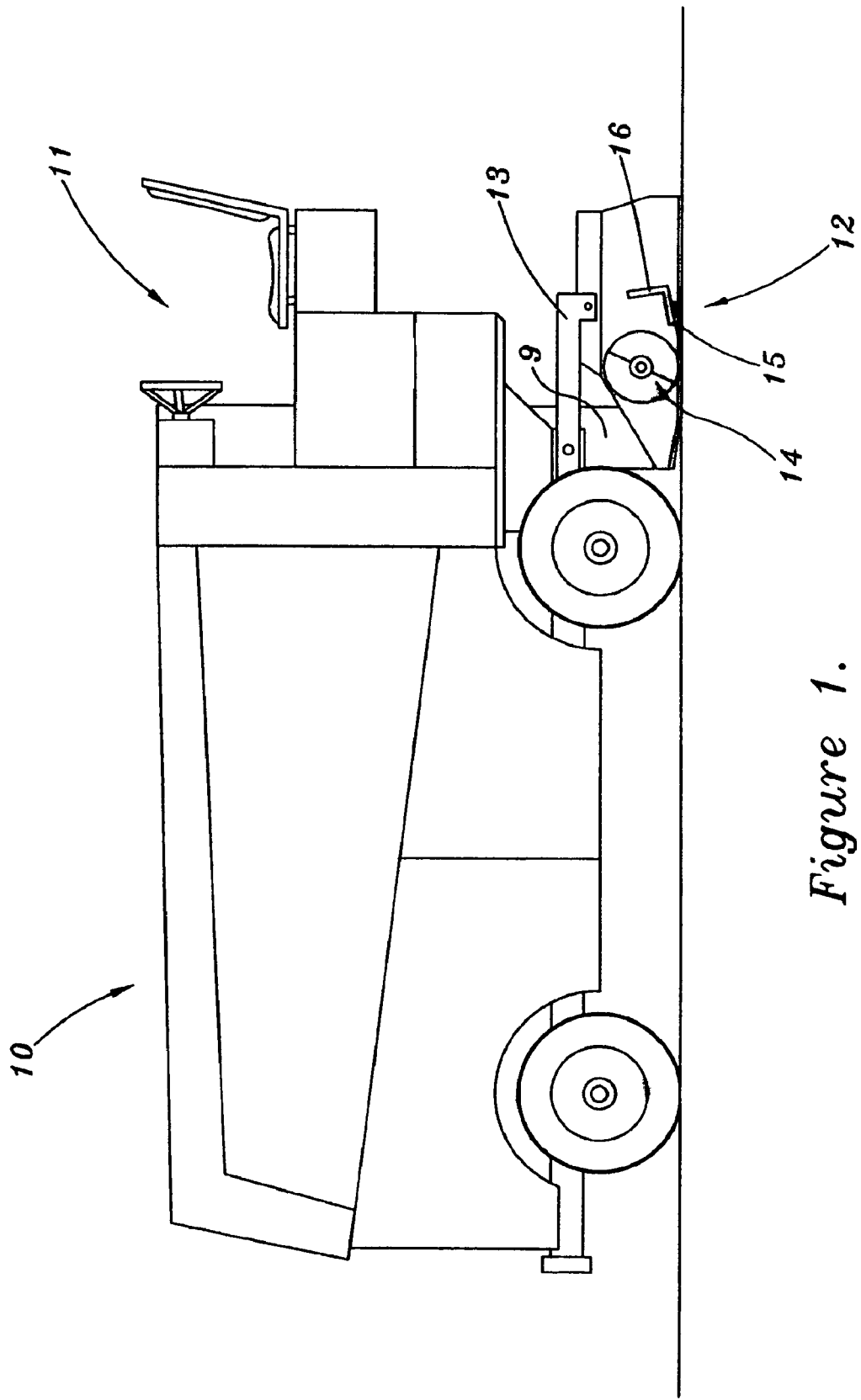
FIG. 1 is a schematic of an ice resurfacing machine.

A schematic of a standard ice resurfacing machine is shown in FIG. 1. Main body (10) encloses an internal combustion motor or electric motor for propelling the unit and powering other components. It also encloses a storage tank for ice shavings, tanks for wash water and ice making water, and an operator's seat and controls (11). The sled or conditioner (12) is attached to main body (10) by hydraulic arms (13).

FIG. 1 shows only some of the components of conditioner (12). A horizontal conveyor (14) for moving ice shavings to the center and throwing them onto a vertical conveyor (9) is placed forward of shaving blade (15) mounted to draw bar (16). Remaining elements of the conditioner are not shown.

FIGS. 2-4 show the flow of ice cuttings during operation. Horizontal conveyor (14) collects ice cuttings generated by cutting blade (15). The helical flights (18) are oriented so that cuttings are swept from the outside toward the center, where slinger paddles (19) throw the cuttings at the open mouth (21) of vertical conveyor assembly (9). The flights (22) of a vertical auger or conveyor carry the cuttings upward to the top (23) of the conveyor, where they are engaged by the vertical slinger paddles (24) and flung into the storage tank.

Figure 5:
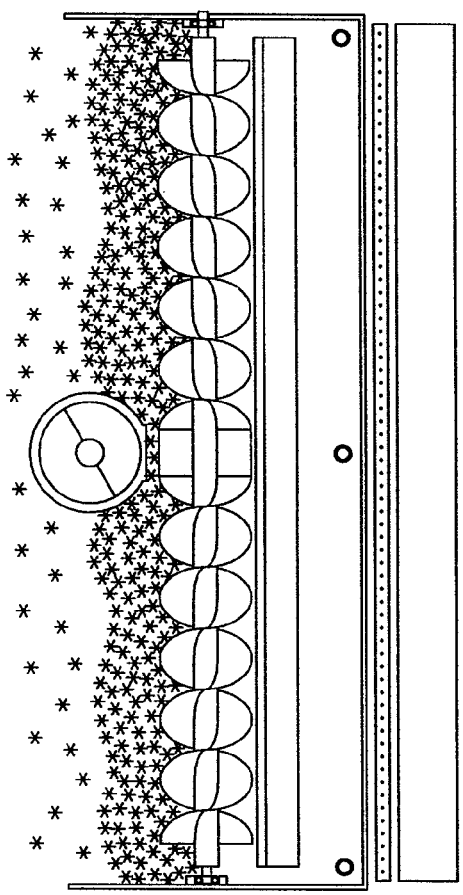
FIG. 5 is a side view of the ice cuttings during operation.
Figure 8:
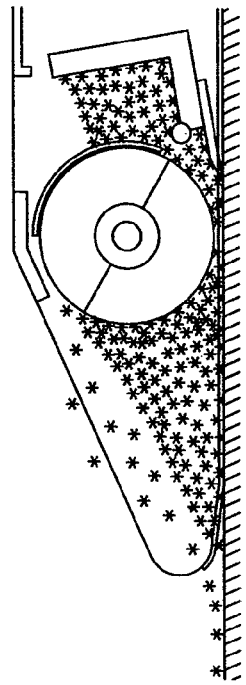
FIG. 8 is a top view of the horizontal conveyor showing ice build-up.
Figure 6:
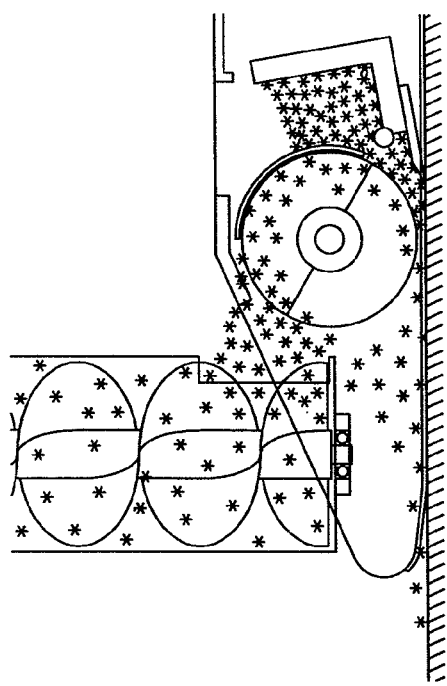
FIG. 6 is a side view of ice cuttings showing a pattern of build-up.
Figure 7:
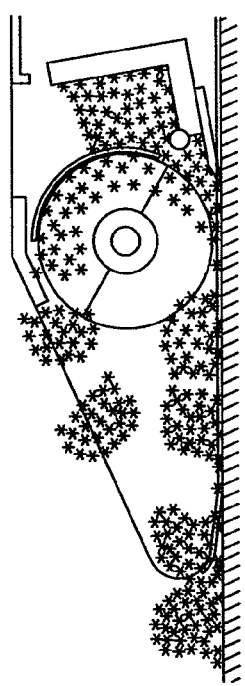
FIG. 7 is a side view of ice cuttings showing blocking build-up.

The problem with ice build-up in front of the horizontal conveyor is shown in FIGS. 5-8. As seen in FIG. 5, a spray of loose ice cuttings is constantly thrown out of the front side of the horizontal conveyor by both the slinger and the centrifugal effect caused by the conveyor's rapid spinning. Some cuttings bounce off the vertical conveyor housing and others fall on the ice in front of the machine. Under certain environmental conditions, ice cuttings form clumps instead of remaining as a fine powder. These clumps may be thrown forward as shown in FIG. 6. If clumps do not fall within the space between the auger flights of the horizontal conveyor, the clumps will be struck by the leading edge of a flight, pushing the clump forward. If clumps are not ingested by the conveyor, they may be combined with thrown ice particles and other clumps to form a build-up that increases in size and weight as the machine moves forward. FIGS. 7 and 8 show an example of build-up in front of the horizontal conveyor.

The ice build-up under the most adverse operational conditions, such as slush on the ice or extreme cold, can become solid enough to support very high pressures exerted by the horizontal conveyor, resulting in a build-up that obstructs the conveyor system, compromising the quality of the resurfacing run. It is possible for the blockage to exert enough force that the machine's rubber-tire-on-ice traction cannot overcome it, resulting in a stopped machine and an aborted conditioning run.

Figure 11:
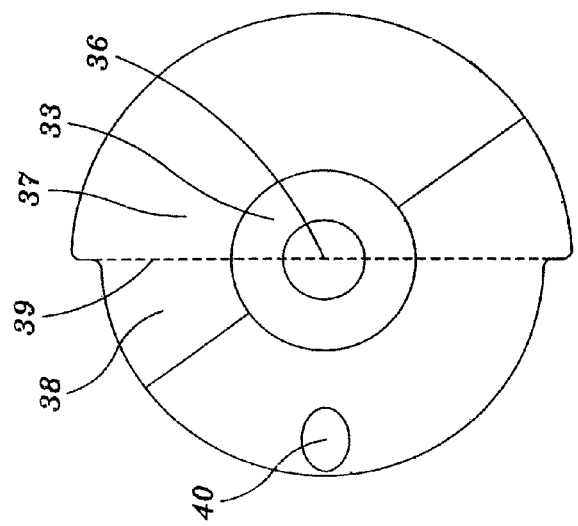
FIG. 11 is a depiction of the flight of FIG. 10 with the radius differential exaggerated.
Figure 10:
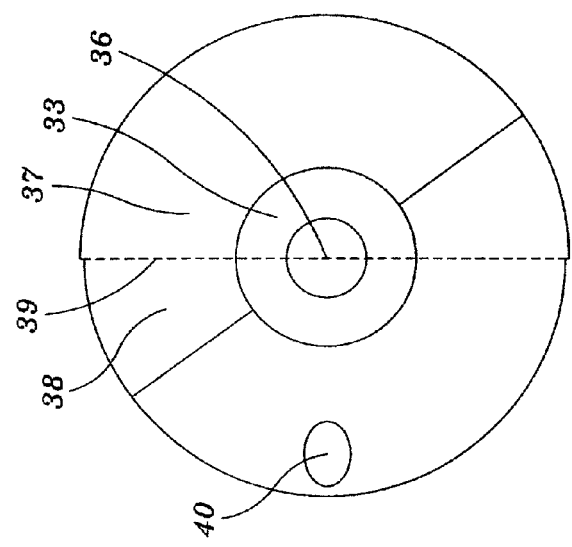
FIG. 10 is an end view of a flight in the conveyor of FIG. 9.
Figure 9:
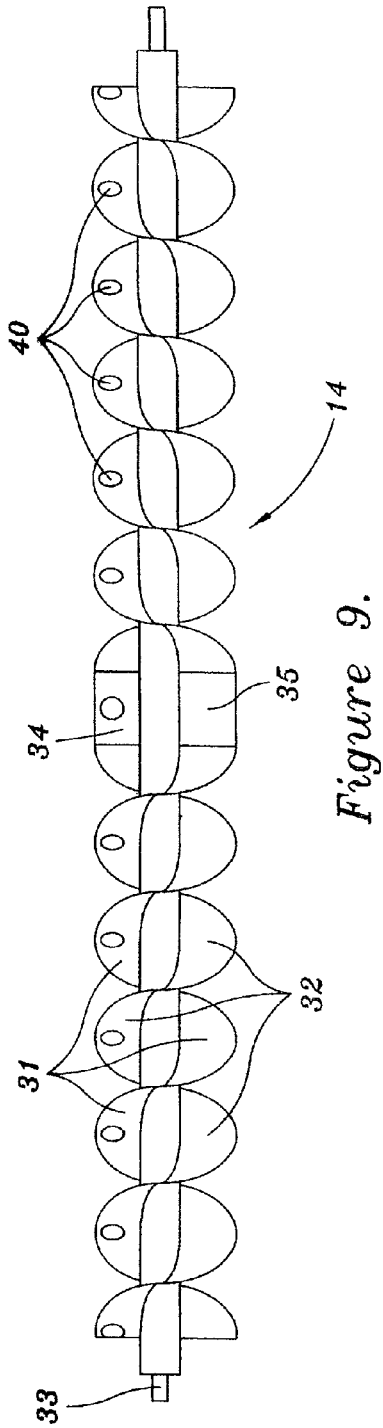
FIG. 9 is a top view of one embodiment of the conveyor of the present invention.
Figure 12:
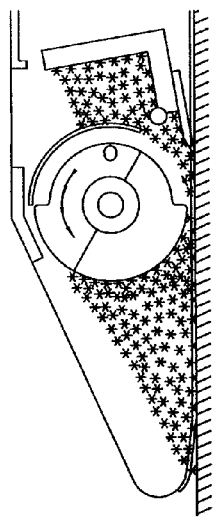
FIG. 12 is an illustration of one embodiment of the invention in operation.

In one embodiment of present invention shown in FIGS. 9-11, the horizontal conveyor (14) uses a double flight design, with two helical auger flights (31, 32) winding around the conveyor's central shaft, (33) and two slinger paddles (34, 35) used in the central slinger section. This new design does not use a circular cross section, and does not use a constant auger flight radius. Instead, the conveyor is bisected lengthwise into two halves along the axis of the conveyor's central shaft. The two conveyor halves have semi-circular cross sections, and create an overall shape of two hypothetical half cylinders of different radius, with each half covering 180 degrees of the 360 degrees of rotation around the conveyor's central shaft.

The semi-circular cross sections of the two half cylinders share a common radius center (36) along the axis of the conveyor's central shaft (33). The two halves differ from each other only in that they have different cross sectional radii, with the radius of one half being slightly smaller than that of the other half. Consequently, the conveyor can be described has having a larger radius half, (37) and smaller radius half, (38) separated from each other by a bisecting plane (39) extending along the axis of the conveyor's central shaft (33). The difference in length between the larger and smaller flight radii used by the new conveyor design is the conveyor's "radius differential". The size of the radius differential is exaggerated in FIG. 11 for visual clarity.

In this embodiment, as each flight winds around the shaft, the flight uses the radius of the half that it is winding through, changing cross sectional radius as its rotation causes it to cross from one half into the other. The conveyor does not use one cross sectional radius exclusively on one of the two flights winding around the central shaft, and a different radius exclusively on the other flight. Both flights use both the larger and smaller radii as they twist around the central shaft, winding back and forth between the larger and smaller radius "sides" of the conveyor.

At all points along the length of the central shaft, one flight is using the larger flight radius (37) when the other flight is using the smaller flight radius (38). There is no point along the new conveyor's length at which both of the two flights use the same flight radius. As a result, every part of any ice cuttings buildup being pushed by the new conveyor is subjected to contact with flights alternating between the larger and smaller flight radii. There is no point along the new design conveyor's length where the ice cuttings buildup is subjected to contact with only one flight radius. Every part of an ice cuttings buildup is alternately swept by flights of both the larger and smaller flight radii.

In order to remain balanced while spinning, the conveyor half using the smaller flight diameter radius is also equipped with counter weights (40) attached to the non-thrusting side (the side of each flight that does not push ice cuttings) of each flight, close to the flight's outer edge. In one embodiment the weights (40) are attached to the smaller diameter flights exactly in the middle of the smaller diameter half of the conveyor with respect to the smaller diameter half's degrees of rotation around the central shaft. The weights compensate for the slightly lower weight of the conveyor flight flanges on the side of the conveyor using the smaller radius. The placement and size of any counterweights will depend on the dimensions of the particular auger, and may readily be determined by one of ordinary skill in the art.

The design of this new horizontal ice cuttings conveyor forces any ice cuttings buildup that may front in front of the conveyor into the space swept by the conveyor flights by using the principle of "positive displacement". Positive displacement of the ice cuttings occurs when the spinning flights of the horizontal conveyor are physically forced into the space occupied by the ice cuttings. Because two solid objects cannot occupy the same space, the ice cuttings must be displaced, or moved aside, by the intruding conveyor flight. Thus the ice cuttings are "positively displaced", meaning they must be displaced and moved by the conveyor flights.

This new horizontal ice cuttings conveyor creates positive displacement of the ice cuttings buildup because edges of the conveyor pushing an ice cuttings buildup forward over the ice surface alternate between using the larger and smaller flight radii once each conveyor revolution. The process the alternating flight radii create is best illustrated by examining what would happen to a hypothetical, fully formed ice cuttings buildup, complete with a solidified and compacted face for the conveyor to push against, if it were placed in front of the new conveyor design. See FIGS. 12-16.

Figure 13:
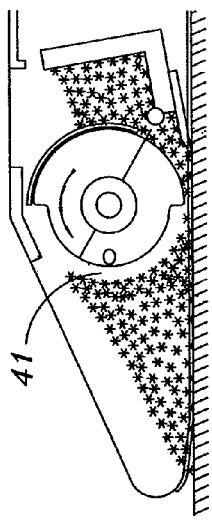
FIG. 13 is an illustration of one embodiment of the invention in operation.

As the conveyor rotates, the continuous transition of the flight edges between using the larger and smaller flight radii creates a repeating sequence of four distinct events that results in the rapid break up and removal of the ice cuttings buildup. The four events repeat each time that the conveyor completes one revolution. In the first of these four repeating events, show in FIG. 12, the hypothetical ice cuttings buildup is in front of the conveyor's larger radius lengthwise half. Once in place, the buildup will initially be pushed over the ice surface just as it is pushed forward by the conventional conveyors currently in use that have a circular cross section. The buildup is initially pushed over the ice by the spinning edges of the larger radius conveyor flights rubbing against the ice cuttings buildup The second of the four repeating events, shown in FIG. 13, is for the conveyor to quickly remove all contact with and physical support for the entire ice cuttings buildup. As the new design conveyor rotates the conveyor flights pushing the ice cuttings buildup switch from the larger flight radius to the smaller flight radius. This transition produces an empty gap (41) very suddenly between the ice cuttings buildup's face and the spinning conveyor flight edges. The size of the gap is equal to the radius differential between the larger and smaller flight radii. The sudden creation of this gap removes the continual contact and support that conventional conveyors with circular cross sections provide to the face of the ice cuttings buildup. This temporarily removes the continual "spine-like" structural support that conventional horizontal conveyors with circular cross sections provide to the ice cuttings buildup.

Figure 14:
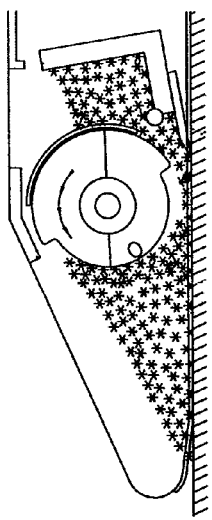
FIG. 14 is an illustration of one embodiment of the invention in operation.

The third of the four repeating events, shown in FIG. 14, is to move part of the buildup into the space that must be swept by the flights on the larger radius lengthwise half of the conveyor. This is accomplished by quickly closing the gap in between the body of the ice cuttings buildup and the flight edges of the conveyor on the smaller radius lengthwise conveyor side almost immediately after the gap forms, and while the smaller radius side is still the side in position to push against the ice cuttings buildup. Because the ice re-surfacing conditioner is in continual forward motion, the conditioner naturally pushes forward to close the gap between the ice cuttings buildup and the edges of the conveyor's spinning flights. The gap is small enough that the normal rate of forward motion of the conditioner easily closes the gap in the time available before the larger diameter lengthwise half of the conveyor can rotate back into contact with the ice cuttings buildup. As a result, the gap is closed by the conditioner's forward motion and the ice cuttings buildup is back in contact with, and being pushed forward by the edges of the conveyor flights on the lengthwise side of the conveyor with the smaller flight radius. When being pushed forward by the lengthwise half of the conveyor using the smaller flight radius, the body of the ice cuttings buildup is closer to the conveyor's central shaft than when it is being pushed by the lengthwise half of the conveyor using the larger flight radius. As a result, when it is being pushed by the smaller radius conveyor half, part of the ice cuttings buildup lies inside space that will be swept by the lengthwise half of the conveyor using the larger flight radius.

Figure 15:
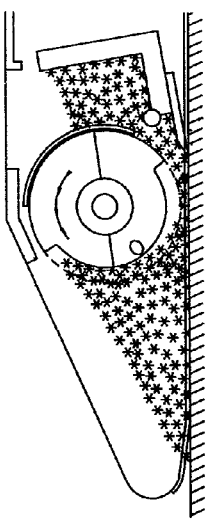
FIG. 15 is an illustration of one embodiment of the invention in operation.
Figure 16:
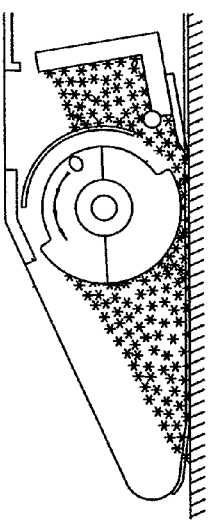
FIG. 16 is an illustration of one embodiment of the invention in operation.

The fourth of the repeating events, shown in FIG. 15, is for the larger radius lengthwise half of the conveyor to rotate back into contact with the ice cuttings buildup, taking a "forced bite" out of the buildup. Just before the larger radius lengthwise half of the conveyor rotates back into contact with the ice cuttings buildup, the buildup is in contact with and being pushed forward by the smaller radius lengthwise half of the conveyor. In this situation, the part of the ice cuttings buildup that is closest to the conveyor lies inside part of the space that must be swept by the flights on the larger radius lengthwise half of the conveyor. This creates a "positive displacement" relationship between the ice cuttings buildup and the larger radius conveyor half. As the larger radius lengthwise half of the conveyor rotates back into contact with the ice cuttings buildup, the outer edge of the conveyor flights must pass through the same space occupied by the closest part of the ice cuttings buildup. See FIG. 16. As a result, the conveyor is forced to take a bite out of the ice cuttings buildup, shearing off and removing the cuttings that make up the closest part of the ice cuttings buildup's face.

The four events repeat with each complete revolution of the conveyor. Consequently, a portion of the ice cutting buildup is removed with each revolution of the conveyor, repeating until the entire ice cuttings buildup is removed from in front of the conveyor. Since the horizontal conveyor normally spins at a several hundred revolutions per minute, the new design horizontal conveyor can eliminate a very large ice cuttings buildup in only a few seconds.

A large difference in flight radius between the two lengthwise halves of the conveyor, or "radius differential" is not needed. The radius differential between the two lengthwise halves only needs to be large enough to cause the conveyor to remove enough of a forming ice cuttings buildup with each revolution that the flow of ice cuttings into the front side of the conveyor is never obstructed. A flight radius differential between the two lengthwise halves of the conveyor of $\frac{1}{16}^{th}$ to $\frac{1}{4}^{th}$ of an inch (1.5 mm to 6.5 mm) should be more than enough to prevent an ice cuttings buildup from obstructing the front of the horizontal conveyor.

There are several advantages to using the smallest radius differential possible that will still prevent the formation of an obstructing ice cuttings buildup. These include ease of conveyor manufacture while maintaining proper conveyor balance, achievement of the smoothest conveyor rotation and most even power consumption possible while actually removing any ice cuttings buildup, having the largest possible total conveyor flight surface area to achieve the most efficient removal of ice cuttings possible, and keeping the conveyor's power consumption as smooth as possible during normal collection and removal of the ice cuttings resulting from ice shaving.

Various alternative embodiments of the present invention will also be effective. A single-flight auger conveyor, rather than the preferred double-flight auger, may be employed. Configuration of the differential radius cross section may also be varied.

Figure 17:
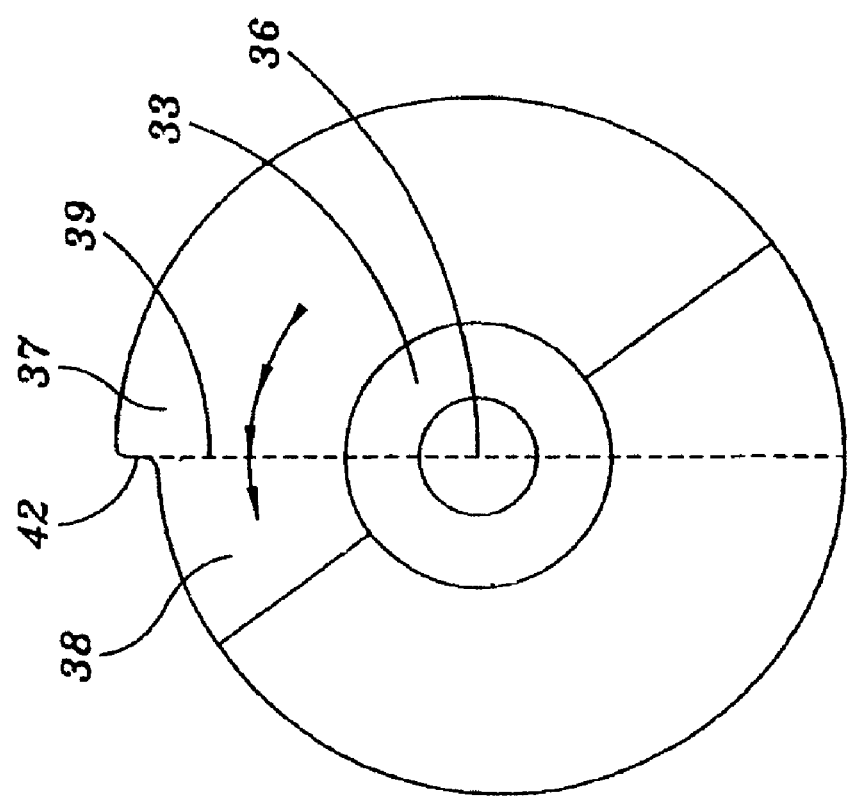
FIG. 17 is an end view of another embodiment of the invention.

FIG. 17 shows one such variation. Transition (42) between the smaller radius portion (38) and the larger radius portion (37) remains abrupt, but there is not another abrupt transition after 180° of rotation. Instead, the radius if the flight continuously variable from the small radius (38) to the large radius (37). The flight may be configured so that the gradual change from the small radius to the large radius takes place over an entire rotation (360°), a half rotation (180°) or something in between. A transitional change from small radius and large radius may also be carried out in less than a half rotation.

Figure 18:
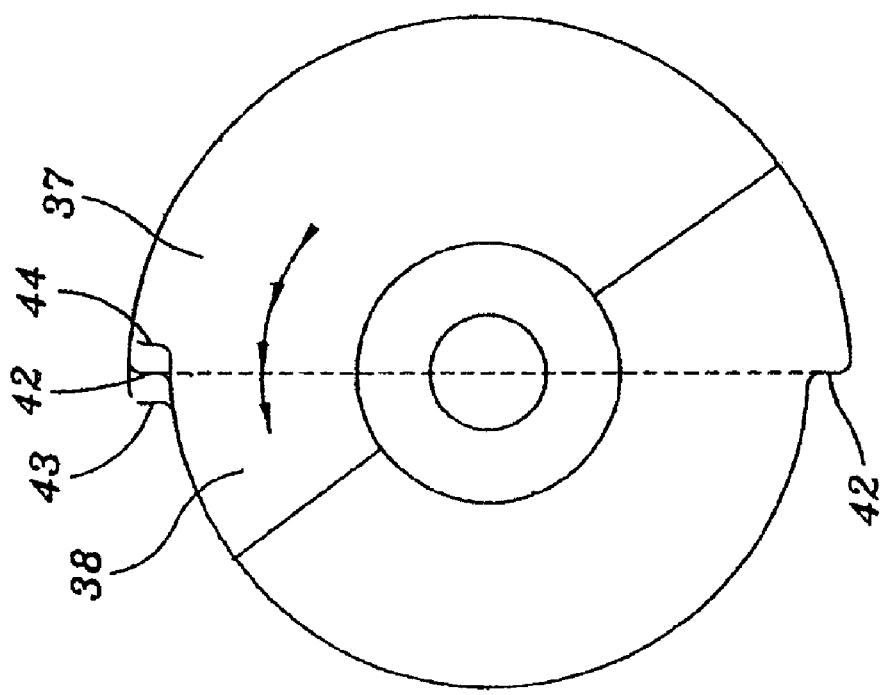
FIG. 18 is an end view of yet another embodiment.

As shown in FIG. 18, for configurations that do have abrupt transitions (42) from small radius (38) to large radius (37) on opposite sides of the flight, those transitions may be more or less than 180° apart. This is illustrated by alternate transitions (43, 44) in the figure. Again, note that in FIGS. 17 and 18 the Radius Differential is exaggerated for illustration.

Figure 19:
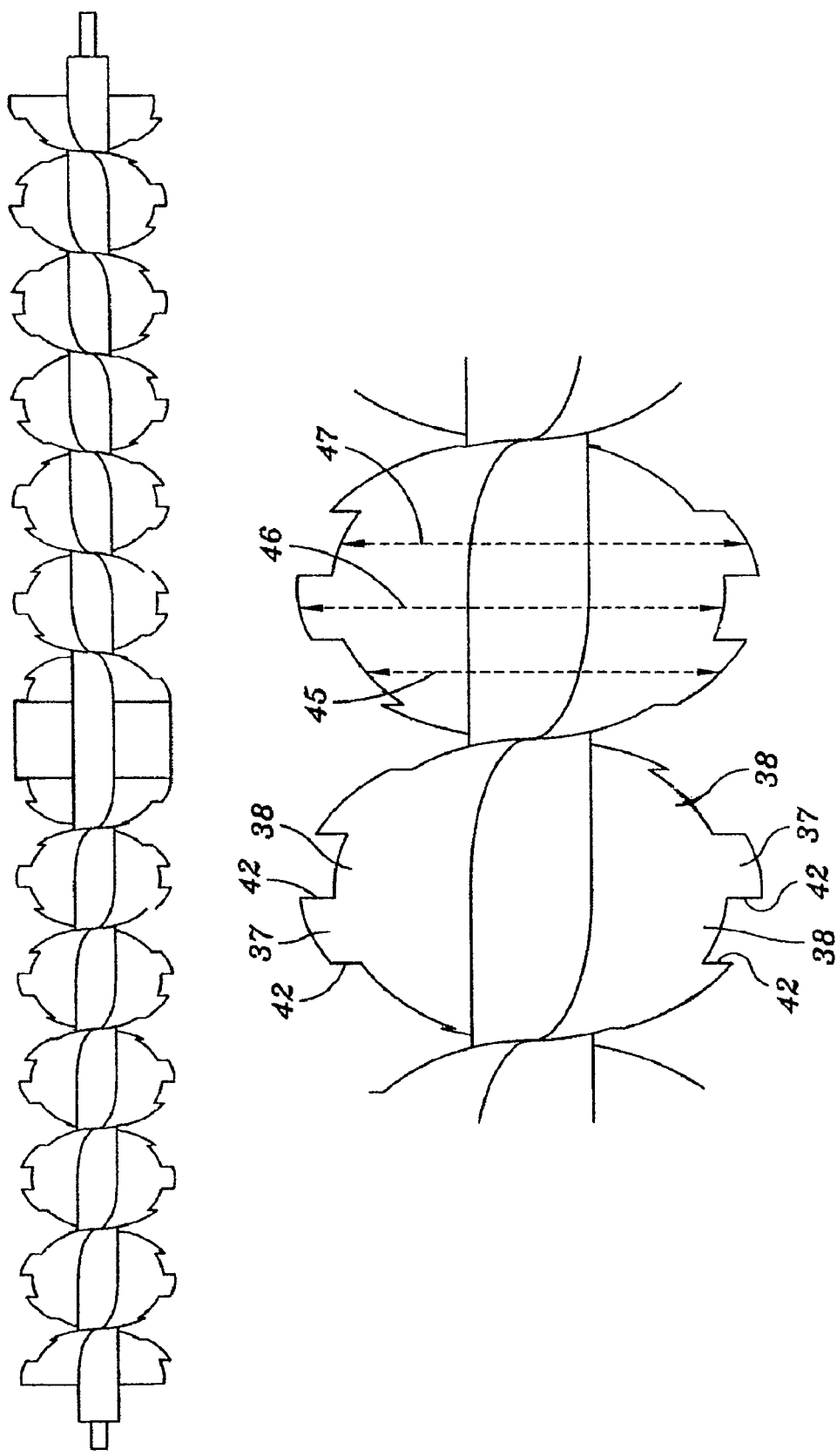
FIG. 19 is a top view of an embodiment of the invention.

Another embodiment of the invention is shown in FIG. 19, with dimensions exaggerated for clarity. Each flight in this embodiment includes a sequence of larger radius (37) portions and shorter radius (38) portions with transitions (42) between. In this embodiment the flights should be arranged so that at any point along the length of the conveyor (45, 46, 47), one flight is using the larger radius and the other flight is using the smaller radius. In this embodiment, the flights change radius every 2 to 6 inches (5 cm to 15 cm).

Figure 20:
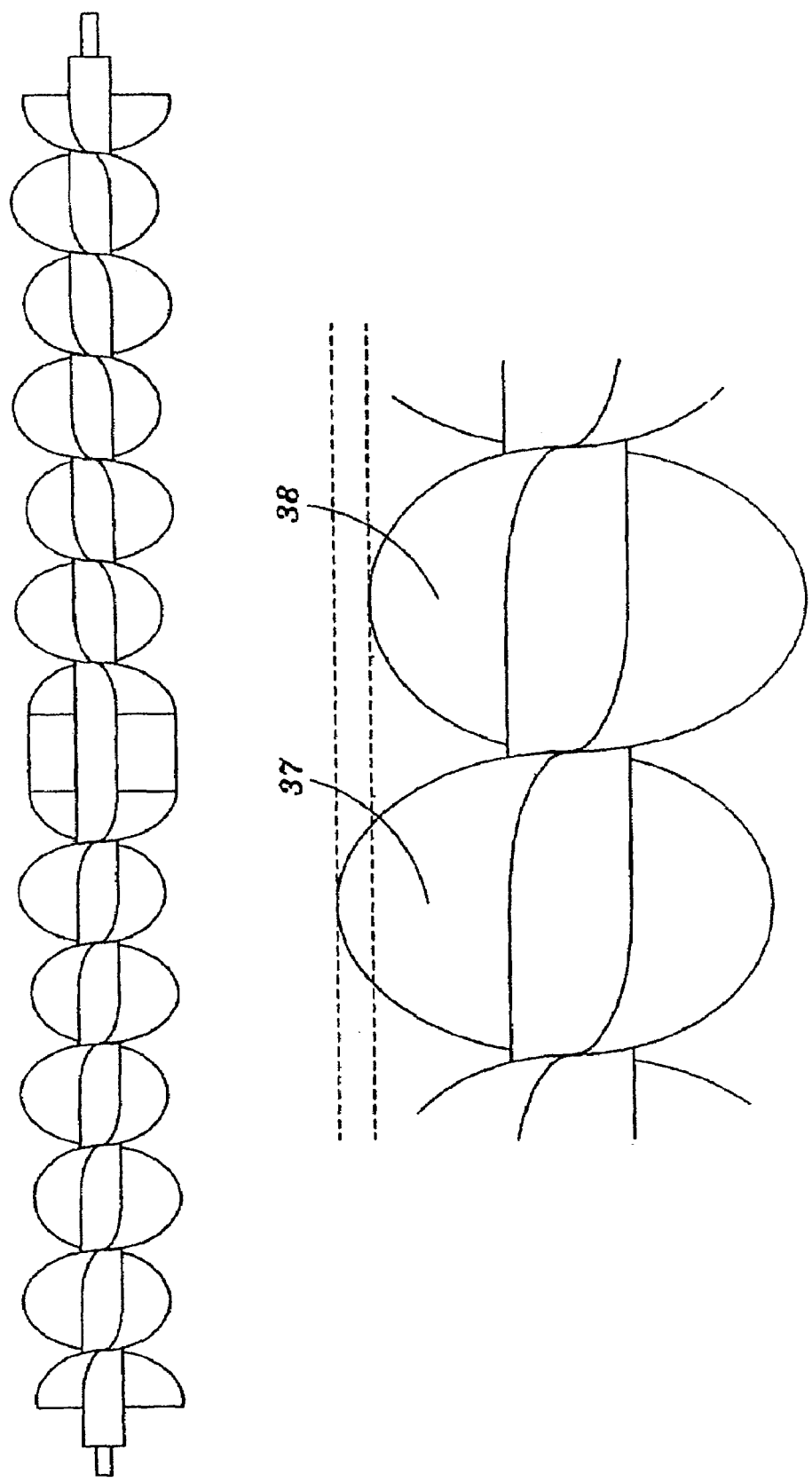
FIG. 20 is a top view of an embodiment of the invention incorporating flights of different radii.

Another embodiment is shown in FIG. 20. In this two-flight configuration, both flights have a circular cross section. One flight has a larger radius (37) and the other has a smaller radius (38). Again, the radius differential is small, and the figure exaggerates the magnitude of the radius differential. This embodiment maintains the desired positive displacement effect because all points along the length of the conveyor shaft use flights of both radii. Consequently, all points along the length of an ice cuttings build-up are alternatively contacted by flights of both radii. generating the desire positive displacement effect.

The invention is suitable as a retrofit modification for existing ice resurfacing machines, as the new design conveyor can be dimensioned to match the fittings of the horizontal conveyor on any of the standard resurfacing machines.

The foregoing description of a preferred embodiment of the invention has been presented and is intended for the purposes of illustration and description. It is not intended to be exhaustive nor limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

What is claimed is:

1. A horizontal conveyor for an ice resurfacing machine comprising a longitudinal shaft, a central ice slinger paddle, and at least a first auger flight disposed along the shaft and configured to push ice cuttings from an extremity of the shaft to the paddle, wherein the radius of the flight varies intermittently between a shorter radius and a longer radius.

2. The horizontal conveyor of claim 1 wherein the radius of the flight abruptly transitions between the shorter radius and the longer radius at intervals of about 180 degrees of rotation.

3. The horizontal conveyor of claim 2 further comprising a second auger flight parallel to and configured in the same way as the first auger flight.

4. The horizontal conveyor of claim 3 wherein the flights are configured so that at any point along the shaft between the paddle and an extremity the radius of one of the flights is the shorter radius and the radius of the other flight is the longer radius.

5. The horizontal conveyor of claim 1 wherein the radius of the flight abruptly transitions between the shorter radius and the longer radius at intervals of about 30 degrees of rotation.

6. The horizontal conveyor of claim 5 further comprising a second auger flight parallel to and configured in the same way as the first auger flight.

7. The horizontal conveyor of claim 6 wherein the flights are configured so that at any point along the shaft between the paddle and an extremity the radius of one of the flights is the shorter radius and the radius of the other flight is the longer radius.

8. The horizontal conveyor of claim 1 wherein the radius of the flight abruptly transitions between the shorter radius and the longer radius at intervals of about 15 degrees of rotation.

9. The horizontal conveyor of claim 8 further comprising a second auger flight parallel to and configured in the same way as the first auger flight.

10. The horizontal conveyor of claim 9 wherein the flights are configured so that at any point along the shaft between the paddle and an extremity the radius of one of the flights is the shorter radius and the radius of the other flight is the longer radius.

11. A horizontal conveyor for an ice resurfacing machine comprising a longitudinal shaft, a central ice slinger paddle, and at least a first auger flight disposed along the shaft and configured to push ice cuttings from an extremity of the shaft to the paddle, wherein the radius of the flight transitions from a shorter radius to a longer radius and back to the shorter radius.

12. The horizontal conveyor of claim 11 wherein the radius of the flight transitions abruptly from a shorter radius length to a longer radius length at a starting point and then gradually decreases along the flight until it reaches the shorter radius length.

13. The horizontal conveyor of claim 11 further comprising a second auger flight parallel to and configured in the same way as the first auger flight.

14. The horizontal conveyor of claim 12 further comprising a second auger flight parallel to and configured in the same way as the first auger flight.

15. A horizontal conveyor for an ice resurfacing machine comprising a longitudinal shaft, a central ice slinger paddle, a first auger flight disposed along the shaft and configured to push ice cuttings from an extremity of the shaft to the paddle and a second auger flight parallel to and configured in the same way as the first auger flight, wherein the radius of the second flight is different from the radius of the first flight.

* * * * *